Patented Dec. 4, 1928.

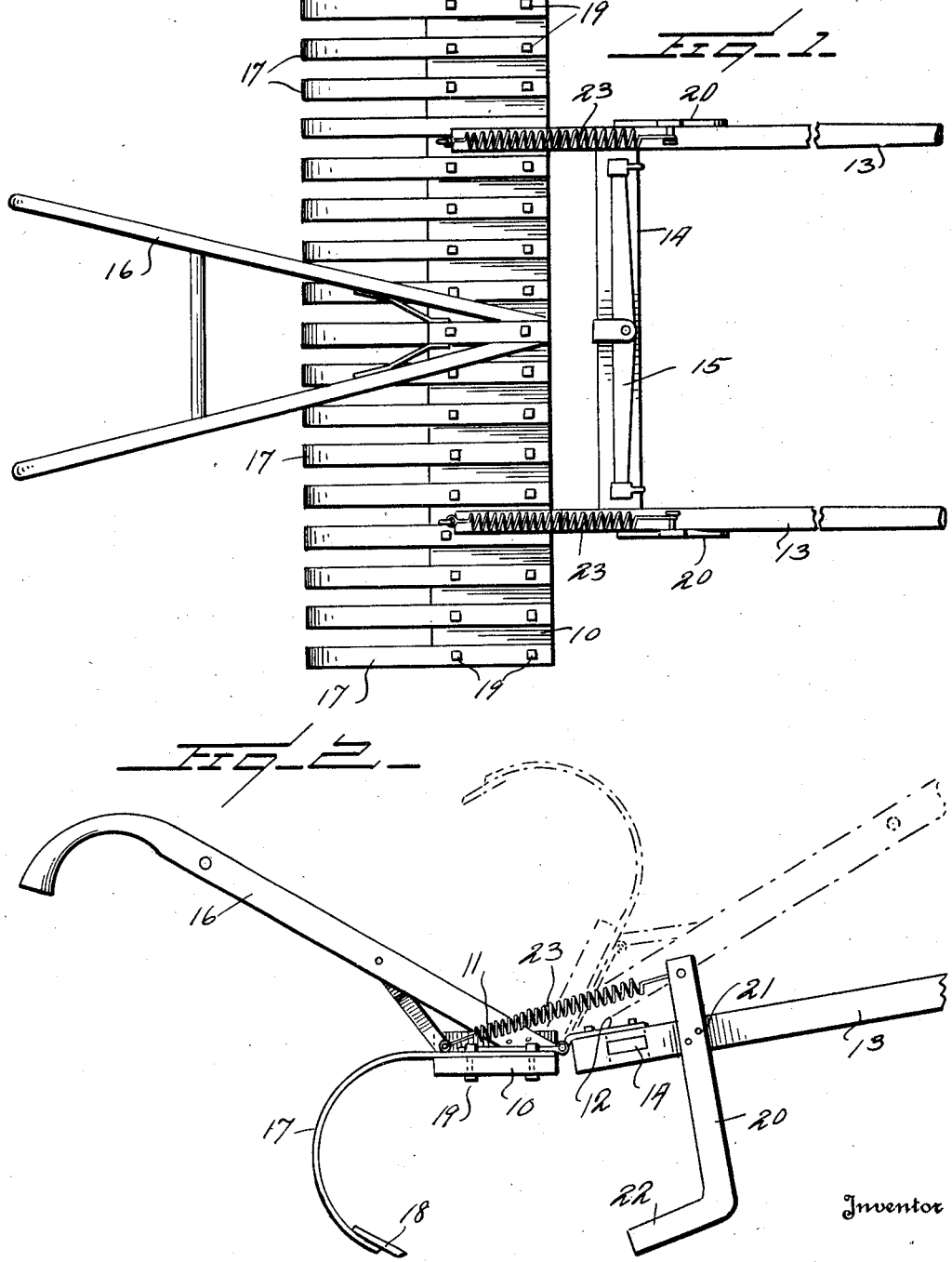

1,694,204

UNITED STATES PATENT OFFICE.

SAMUEL FONTAINE BROWN, OF HETH, ARKANSAS.

CROSS-ROW COTTON BLOCKER.

Application filed October 29, 1927. Serial No. 229,722.

This invention relates to cotton choppers or blockers of that type wherein the cotton is chopped or blocked by means of plows or like implements operating transversely of the rows.

The general object of the present invention is to provide a cotton chopper of this character having a plurality of teeth adjustably mounted upon a transverse beam so that these teeth may be adjusted nearer to or further from each other or plow points of different character disposed upon the ends of the teeth and the teeth differently spaced from each other.

A further object is to provide a device of this character which does not have wheels but is mounted upon two slides which engage the ground.

A still further object is to provide a device wherein the tooth-carrying beam is hingedly mounted upon draft bars or shafts and a spring is used slightly counterbalancing the weight of these plow teeth and the handles for operating the same, this construction permitting the plows to be turned over in the event of striking a stone or other obstruction which would tend to break the plow points or whenever it is desired that the plow points shall not operate or in dumping trash from in front of the plow points.

My invention is illustrated in the accompanying drawing, wherein:—

Figure 1 is a top plan view of my improved cotton blocker;

Figure 2 is a side elevation showing the teeth raised in dotted lines.

Referring to this drawing, 10 designates a transversely extending beam which may be about ten inches wide and of any desired length. This beam is hinged by the hinge leaves 11 and 12 to the shafts or thills 13. These thills are provided with a cross bar 14 upon which is mounted the usual whiffletree 15.

Mounted upon the beam 10 are the upwardly and rearwardly extending handles 16, and mounted upon the upper face of this beam 10 are the rearwardly, downwardly and forwardly extending teeth 17 of spring steel, which teeth are preferably two inches wide and may be of any desired depth. The teeth are perforated at their lower ends to permit the plow points 18 to be mounted thereon and the teeth are held in place upon the beam by the bolts 19. By removing these bolts and shifting the teeth, the teeth may be disposed nearer to or further from each other. In other words, some of the teeth may be removed at intervals to permit greater spacing between the teeth. The teeth are normally, however, about two inches apart.

Mounted upon the thills 13 are the runners 20 or feet, these runners being riveted, bolted or otherwise attached at their upper ends to the thills, as at 21, and extending downward and then rearward in a curve, as at 22, this curved portion 22 riding upon the ground and constituting runners or slides. Preferably the weight of the teeth, the beam 10 and of the handles is partially counter-balanced by the coiled contractile springs 23, the rear ends of which are attached to the beam 10 adjacent the rear edge thereof and the forward ends of which are attached to any suitable upwardly projecting member on the thills and, as shown, each runner 20 may be extended above the thills and the forward ends of the springs connected to these runners. I do not wish to be limited to this, however.

In the use of this device, the cotton chopper is to be drawn transversely of the rows and obviously the teeth will cut out the cotton at even intervals. Whenever the teeth gather trash or other material that has to be dumped, the handles may be shifted to turn the beam 10 over upon the rear portions of the thills. This may also be done when traveling along roads or crossing fields where it it not desirable to use the teeth.

Because of the spacing of the teeth and the size thereof, cotton can first be thinned out, leaving only a few plants every couple of inches, and then as the plants grow in size the spacing can be increased and the size of the points or teeth can be increased, which is a considerable advantage. By hinging the supporting beam and teeth to the thills, the teeth may be cleared of weeds and cotton stalks in the field by dumping. Obviously, different forms of plow points may be used on the teeth, and while the device is particularly designed for use as a cotton blocker or chopper, it obviously may be used for cultivating other crops and is particularly capable of being used as a cross row cultivator.

While I have illustrated certain details of construction and arrangement of parts, I do not wish to be limited thereto as it is obvious that many changes might be made therein without departing from the spirit of the invention as defined in the appended claim.

I claim:—

A cross row cotton chopper of the character described including thills, runners mounted upon the thills and extending downward and rearward therefrom and upward above the thills, a transversely extending beam hinged to the thills for movement in a vertical plane and having upwardly and rearwardly extending handles, downwardly, rearwardly and forwardly extending teeth detachably mounted upon the beam and adapted to carry plow points at their lower ends, and contractile springs connected to the rear edge of said beam and operatively mounted at their forward ends upon the ends of the runners which extend above the thills and exerting a lifting force upon the beam.

In testimony whereof I hereunto affix by signature.

SAMUEL FONTAINE BROWN.